United States Patent [19]

Canton et al.

[11] 4,228,732
[45] Oct. 21, 1980

[54] DEVICE FOR THE EXTRACTION OF JUICES AND ESSENTIAL OILS FROM WHOLE FRUITS, IN PARTICULAR FROM CITRUS FRUITS

[75] Inventors: Mario D. Canton; Andrea Bonfiglio, both of Tremestieri, Italy

[73] Assignee: W. Sanderson & Sons S.p.A., Valeria, Italy

[21] Appl. No.: 950,648

[22] Filed: Oct. 12, 1978

[30] Foreign Application Priority Data

Dec. 6, 1977 [IT] Italy ........................ 52101 A/77
Jun. 1, 1978 [IT] Italy ........................ 49659 A/78

[51] Int. Cl.² .......................... A23N 1/00; B30B 9/02
[52] U.S. Cl. .................................... 99/509; 100/105; 100/108; 100/128; 100/213
[58] Field of Search ................. 99/495, 496, 509, 510, 99/513; 100/105, 107, 108, 213, 98, 128

[56] References Cited

U.S. PATENT DOCUMENTS

| 3,053,170 | 9/1962 | Cook | 100/108 |
| 3,736,865 | 6/1973 | Hait | 100/108 |
| 3,866,528 | 2/1975 | Montagroni | 99/509 |
| 3,954,032 | 5/1976 | Holbrook | 99/495 |
| 4,070,959 | 1/1978 | Bushman et al. | 99/510 |

Primary Examiner—Harvey C. Hornsby
Assistant Examiner—Timothy F. Simone
Attorney, Agent, or Firm—Beveridge, DeGrandi, Kline & Lunsford

[57] ABSTRACT

Device for the extraction of juices and essential oils from whole fruits, in particular from citrus fruits, wherein it comprises, in combination, a series of cylindrical elements, having a vertical axis, telescopically set with a slight radial clearance, a second series of cylindrical elements, axially aligned with the preceding one and symmetrically disposed at such an interval as to allow for the insertion of a fruit, and means to draw closer said cylindrical elements of the two series in a differentiated way, so as to cause with their edges, a progressive compressive action, substantially distributed all over the fruit surface.

13 Claims, 12 Drawing Figures

DEVICE FOR THE EXTRACTION OF JUICES AND ESSENTIAL OILS FROM WHOLE FRUITS, IN PARTICULAR FROM CITRUS FRUITS

The present invention concerns a device for the extraction of juices and essential oils from whole fruits.

The industrial processing of citrus fruits concerns the extraction of the essential oils contained in the glands of the epicarp, and the juice of the endocarp. The residual rind from the processing, if it is not too chopped up or shredded, is cut into small cubes or slices, which when pickled are used by the confectionary industry, or are used in other processes aiming at the extraction of other substances contained both in the epicarp and the mesocarp.

As is well known by the technicians of this branch, one of the method of extracting essential oil consists in manually squeezing the exocarp against a sponge (after the fruit has been cut in half and the endocarp has been extracted always by hand), in such a way that the sponge itself absorbs the essential oil.

Periodically, the sponge is squeezed to free the essential oil thus collected. It is evident that the cost of the product thus obtained is very high, mainly due to the very strong incidence of labor and to the low yield of the method.

It is the object of the present invention to realize a device capable:

(I) of obtaining in an economic and rapid way, an essential oil very similar to the "sponge" type, inasmuch its recovery is achieved without the use of water as a vehicle;

(II) of performing the squeezing of the juice simultaneously with the recovery of the essential oil, with no contaminations occuring between the two products. In particular, of obtaining a juice completely free from the bitter taste which characterizes the presence of essential oil;

(III) of providing as a residue, a structurally integral rind like an emptied bag, therefore suitable to be used in subsequent processes as previously mentioned.

According to the present invention, therefore, one foresees a comprehensive device, in the combination of a series of cylindrical elements having a vertical axis, set telescopically with slight radial clearance, a second series of cylindrical elements axially aligned with the preceding one and set at such an interval as to allow for the insertion of a fruit, and means to draw nearer in a differential way said cylindrical elements of the two series, so as to cause, with their edges a progressively compressive action, substantially distributed over the whole spherical surface of the fruit.

The law of the relative sliding motion of the cylinders of each series is such as to cause a progressive reduction of the spherical space wherein the fruit is placed, thus giving rise to such a wrinkling on the rind of the fruit itself as to extract all the essential oil which drains into the intervals between the lower cylinders and at the same time carries out the squeezing of the juice, which is conveyed into the inner cavity of the lower central cylindrical element.

In a second embodiment of the device, the two vertical bars whereon the two series of cylinders are slidingly assembled, are fixed to the periphery of an annular rotor, and each of said cylinders carries a bearing slidingly engaged in a helicoidal guide machined in a stationary cylindrical body, coaxial with said rotor.

The connection between each cylinder and said vertical basis obtained by means of a pair of diametral arms, projecting outwardly to the cylinder and each terminating with a guiding skid, sliding in a groove machined in each of said bars.

The present invention will now be described with reference to the accompanying drawings, which represent by way of illustration and not of limitation, two preferred embodiments of the present invention itself.

Figure 1:
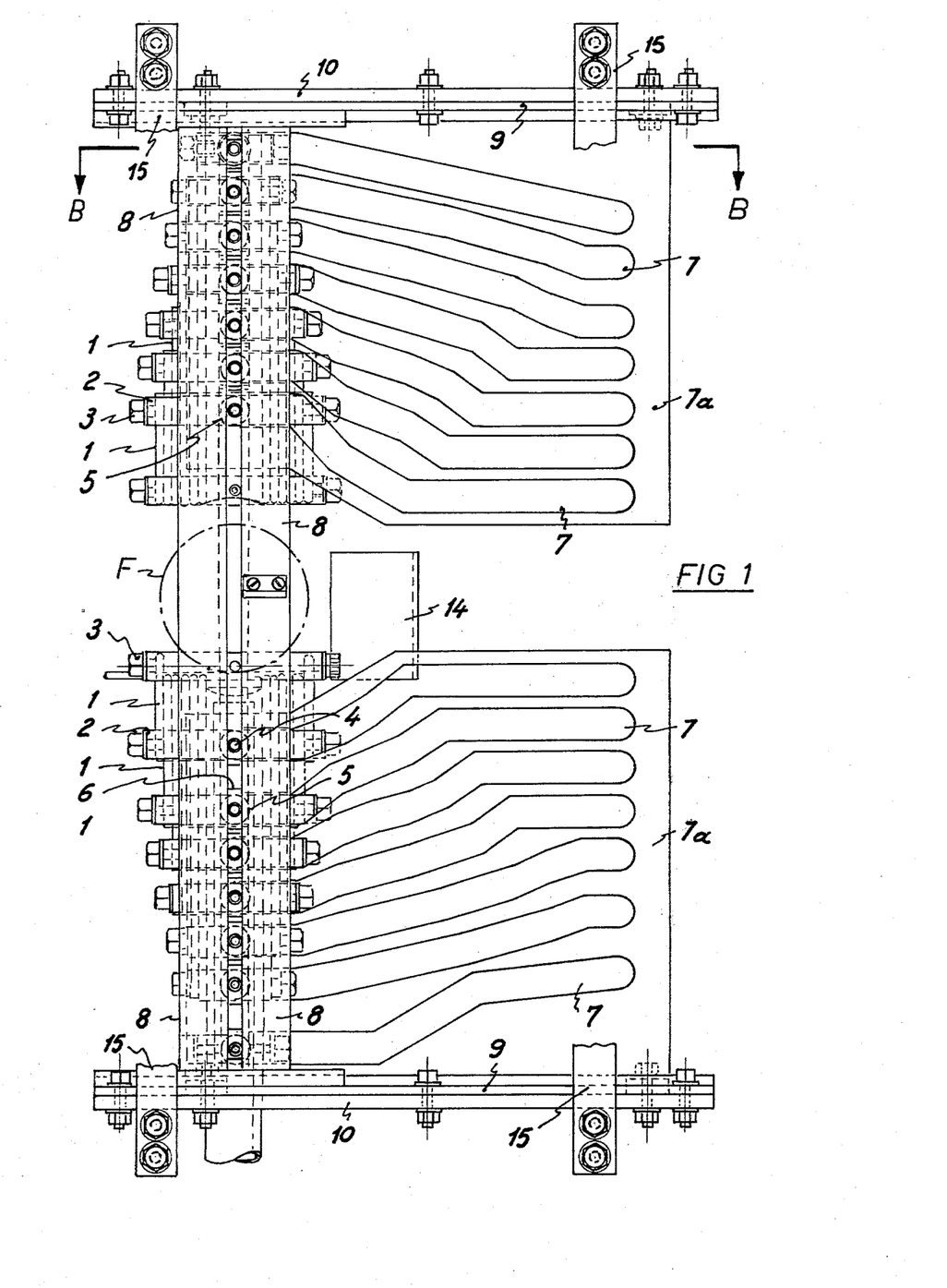
FIG. 1 represents the lateral perspective view of the device.
Figure 2:
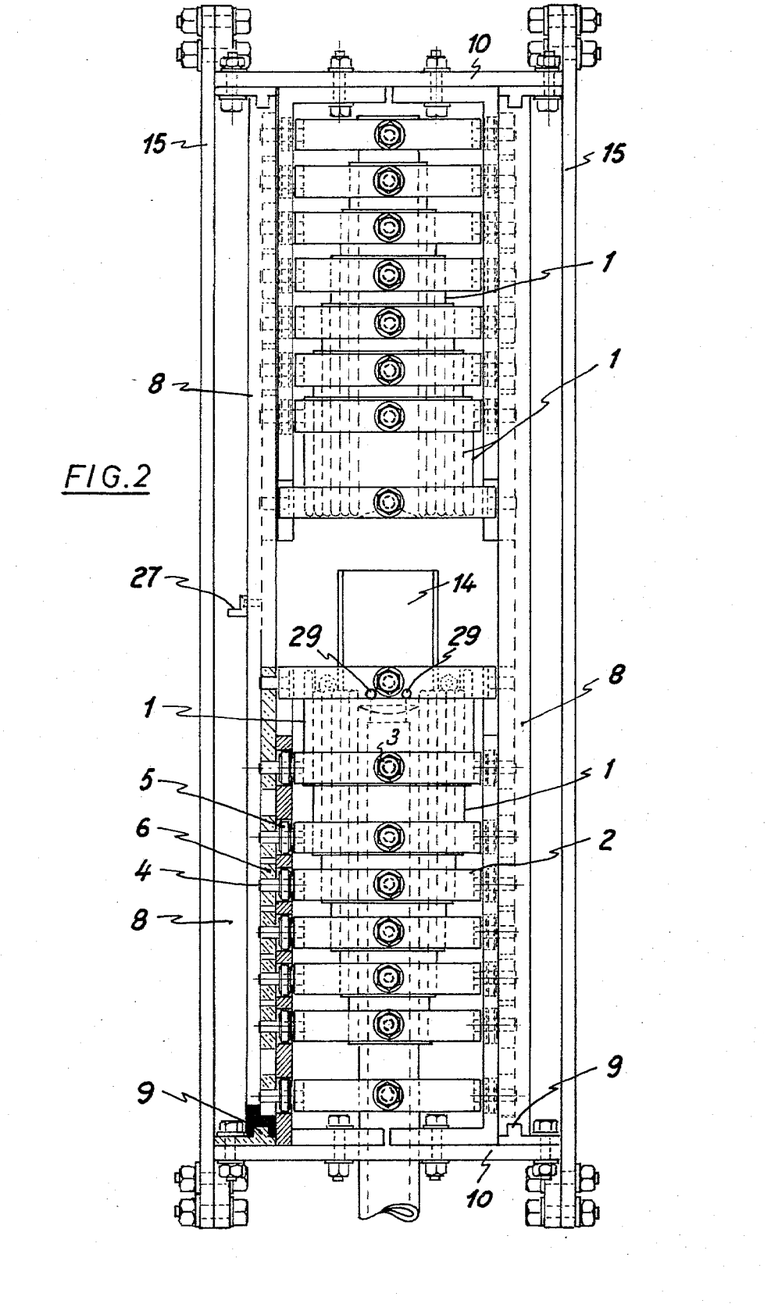
FIG. 2 is the frontal perspective view, in partial section along line A—A of FIG. 3.
Figure 3:
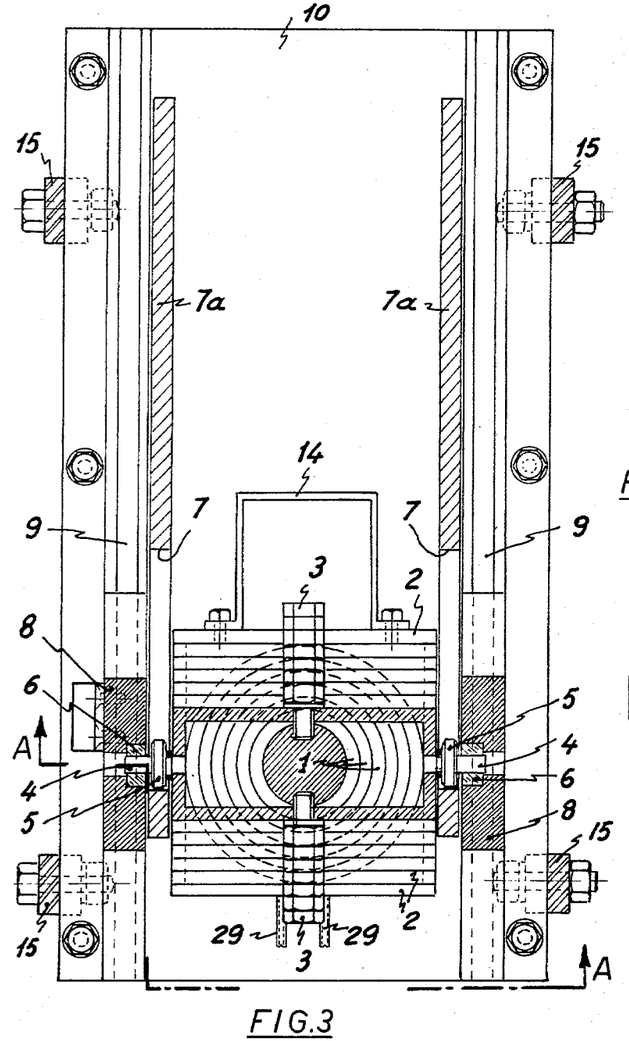
FIG. 3 is the sectional view along plane B—B of FIG. 1.

With reference to FIGS. from 1 to 3, the device, according to the present invention, is constituted of two series of superimposed cylinders 1, coaxially disposed, telescopically sliding with a slight radial clearance. Cylinders 1, are of a length which increases with the decrease of the diameter and are associated to quadrangular supports 2, fixed by means of screws 3. In a position diametrally opposite to that of screws 3, supports 2 bear a pair of pivots 4 inserted in rolling bearings 5 and in skids 6 slidingly set into guides machined in vertical bars 8. These latter, in turn, are slidingly set on horizontal skids 9 fixed to bases 10, which, together with stanchions 15 which connect them, form the stable frame of the machine.

Two pairs of plates 7a, bearing the structurally shaped slots or cammes, wherein bearings 5 can slide, are integral with the machine frame. A thrust unit, not illustrated because well known, puts into reciprocating motion the ends of bars 8 along the horizontal skids 9.

Figures 4, 5, 6:
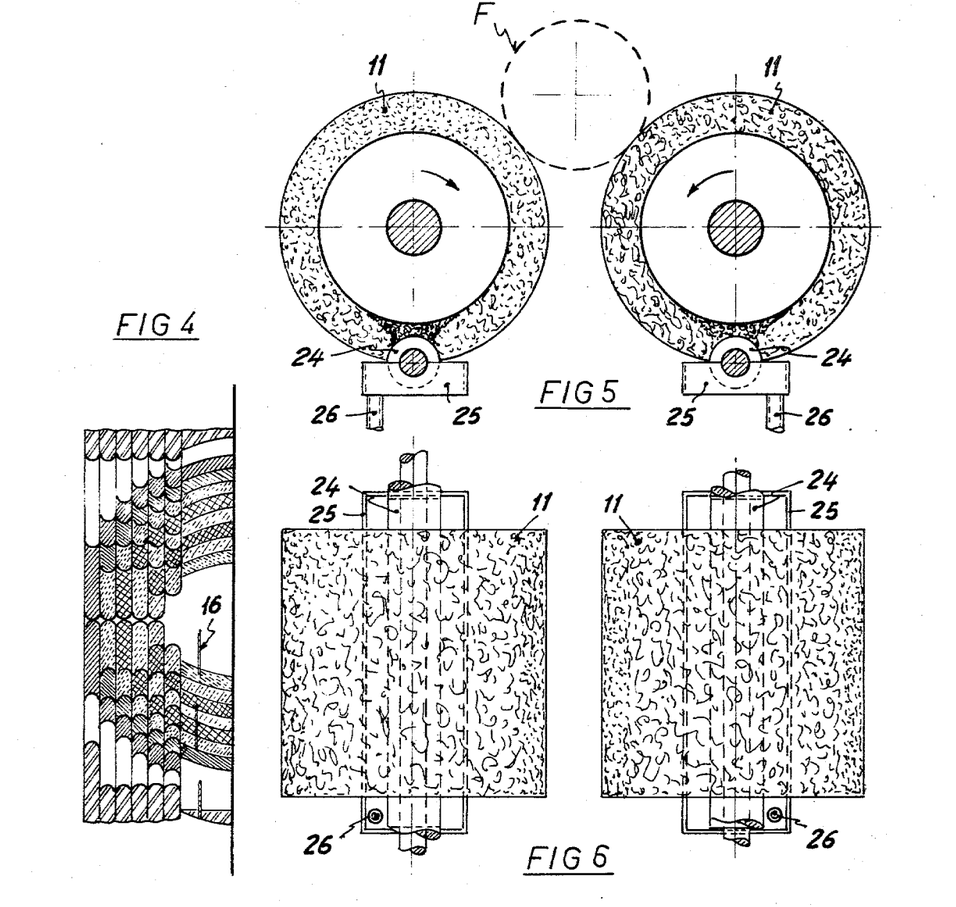
FIG. 4 represents the diagram of the subsequent positions of the two series of operating cylinders, in partial section view along an axial plane.
FIG. 5 represents the detail of the rollers for the recovery of the superficial essence, in a lateral perspective view.
FIG. 6 is the plant view corresponding to FIG. 5.

The operation is as follows: when the unit is in the position illustrated in FIG. 1, a distributor system, not illustrated because it is not part of the present invention, places a fruit F on the series of lower cylinders 1. The edges of cylinders 1, in this phase, are aligned on a plane, with the exception of the cylinder having the greater diameter, which protrudes upwards to provide an edge of circumferential enclosure around fruit F. At this point, bars 8 move towards the right, watching FIG. 1, and bearings 5, which run along structurally shaped slots 7, compel the various cylinders of the two series to slide telescopically among each other, according to a motion law which determines a gradual contraction of the space wherein fruit F is placed. Such a motion law is graphically illustrated in FIG. 4, which shows the various positions taken at intervals by the two series of cylinders. It appears evident from the observation of FIG. 4, that the outer cylinders of the two series are the first to come into contact, thus enclosing the housing of the fruit, and, gradually, the subsequent cylinders become closer, as do the two central cylinders, which then stop at a certain distance, at the end of the stroke. In other words, the edges of the cylinders exert, in a progressive manner, a compression over the spherical surface of the fruit. During said compression, wrinkles occur on the rind of the fruit, which cause the glands to break with the consequent outburst of the essential oil, which flows into the clearances existing between the lower cylinders, and collect in a tray underneath, which will be subsequently described. Eventually, grooves can be devised along the surfaces of the lower cylinders to facilitate the flow of said essential oil.

The edge of the cylinders is blunted to avoid lesions on the rind of the fruit. In the drawings, the profile of said edge is semicircular, but it must be understood that the profile itself may assume any other configuration suitable for exerting the desired action on the fruit, without causing lesions in the rind.

Figure 7:
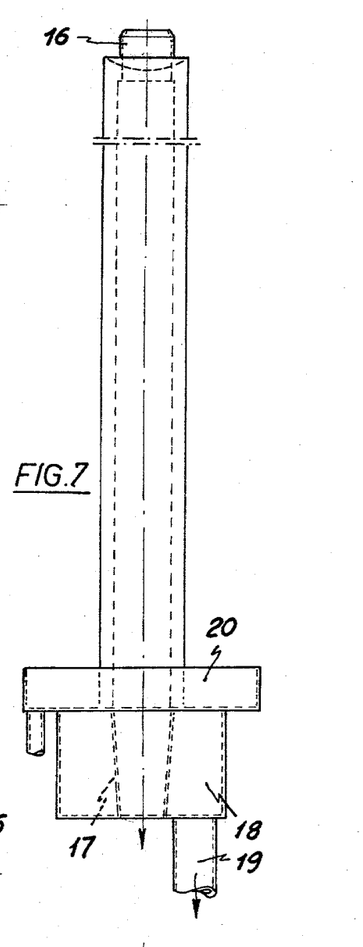
FIG. 7 shows the detail of the central cylinder of the lower series in perspective view.
Figure 8:
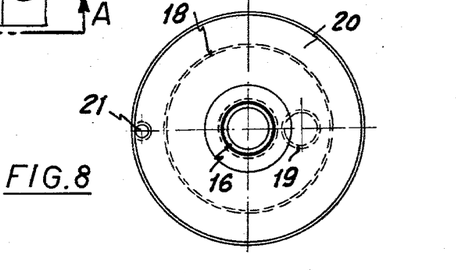
FIG. 8 is the plant view corresponding to FIG. 7.

In FIGS. 7 and 8 detail of the lower cylinder is shown. It is supplied with a cutting edge 16 with the aim of penetrating into the lower part of the fruit (see also FIG. 4) to let the juice flow with no contamination of the essential oil. The sharp crown 16 cuts into the rind, and the juice together with fibrous part of the endocarp, falls into the inner cavity of the cylinder and reaches the tapered part of basis 17 consisting of a riddled wall. Because of the compression occurring in said conic section, the liquid part (juice) collects into tray 18 and flows from small tube 19, while the fibrous part (wastes), comes out from the terminal part of conic section 17. Above tray 18 and separated from same, another tray 20 is provided with a small outlet tube 21, wherein falls the essential oil coming from the superimposed cylinders.

Figure 4A:
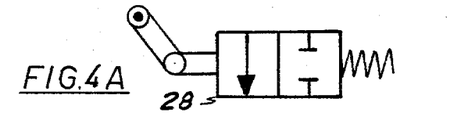
FIG. 4a represent schematically a pneumatic valve.

Once the squeezing has been completed, bars 8 initiate the return stroke and the cylinders get progressively further away from each other, until they return to the initial position. Just before the termination of the cycle, small square prong 27, which moves jointly with bars 8, operates a pneumatic valve 29 (FIG. 4A-symbol CE-TOP), which releases a jet of compressed air from small tubes 28, which removes the squeezed rind, to make place for another fruit. The rind hits template 14 and falls onto the pair of counter rotating rollers 11, illustrated in FIGS. 5 and 6. Rollers 11 rotate at a differential speed and with their spongy lining take away the portion of essential oils remaining on the surface of the rind. The portion of essential oils thus recovered, is squeezed by means of squeezing rollers 24 and collects into trays 25 wherefrom it flows by means of small tubes 26.

It is evident that a series of devices such as those heretofore described may be grouped to form an industrial machine.

Figure 9:
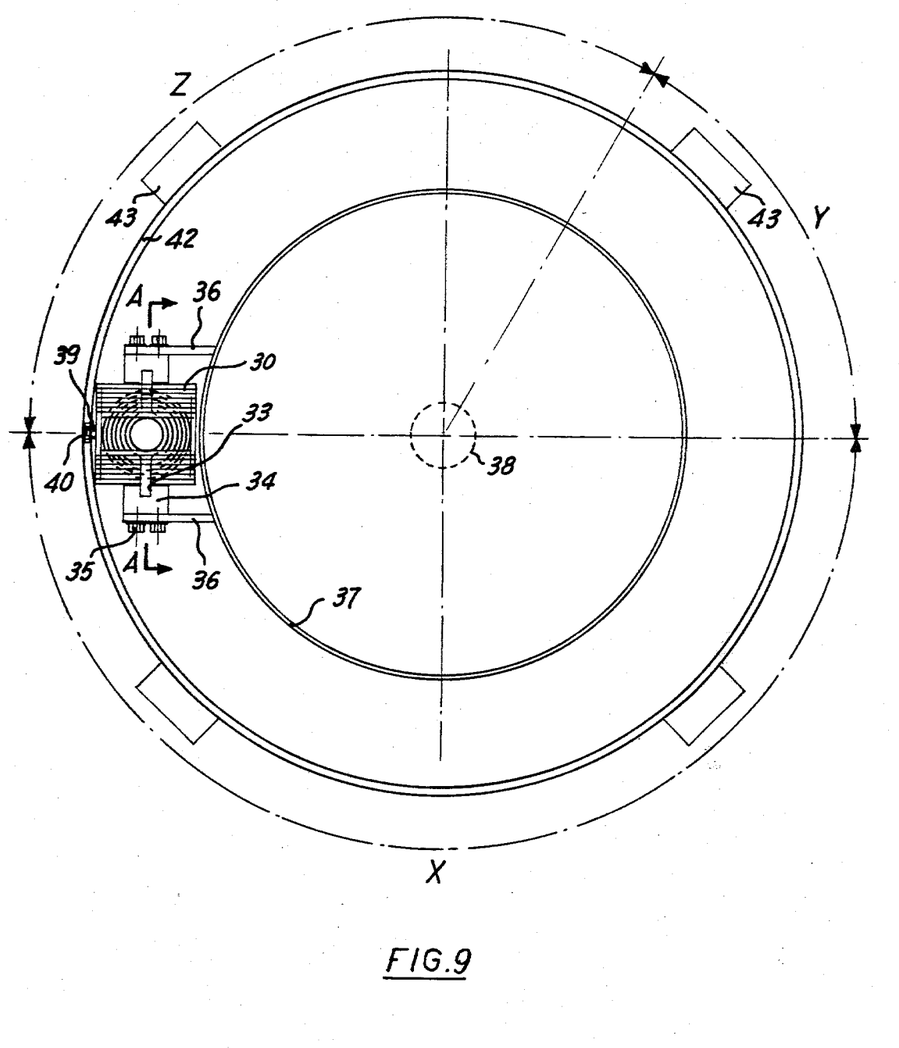
FIG. 9 represents a second embodiment of the present invention in plant view.
Figure 10:
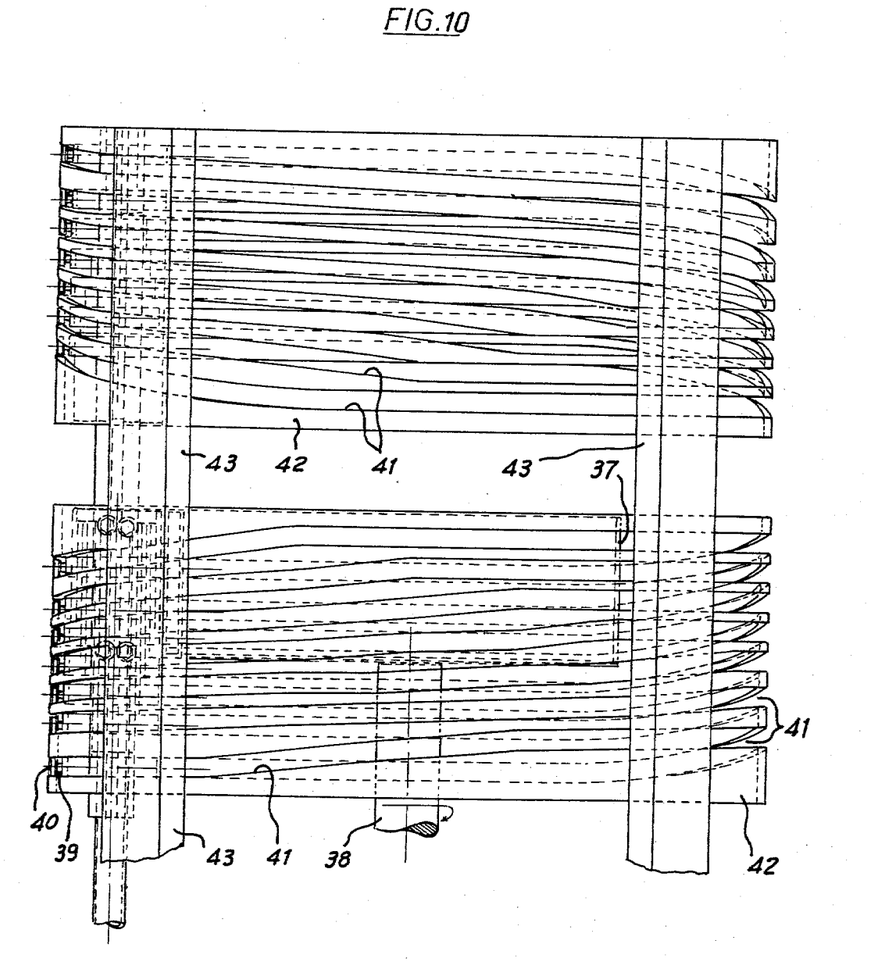
FIG. 10 is a lateral perspective view of the alternative of FIG. 9.
Figure 11:
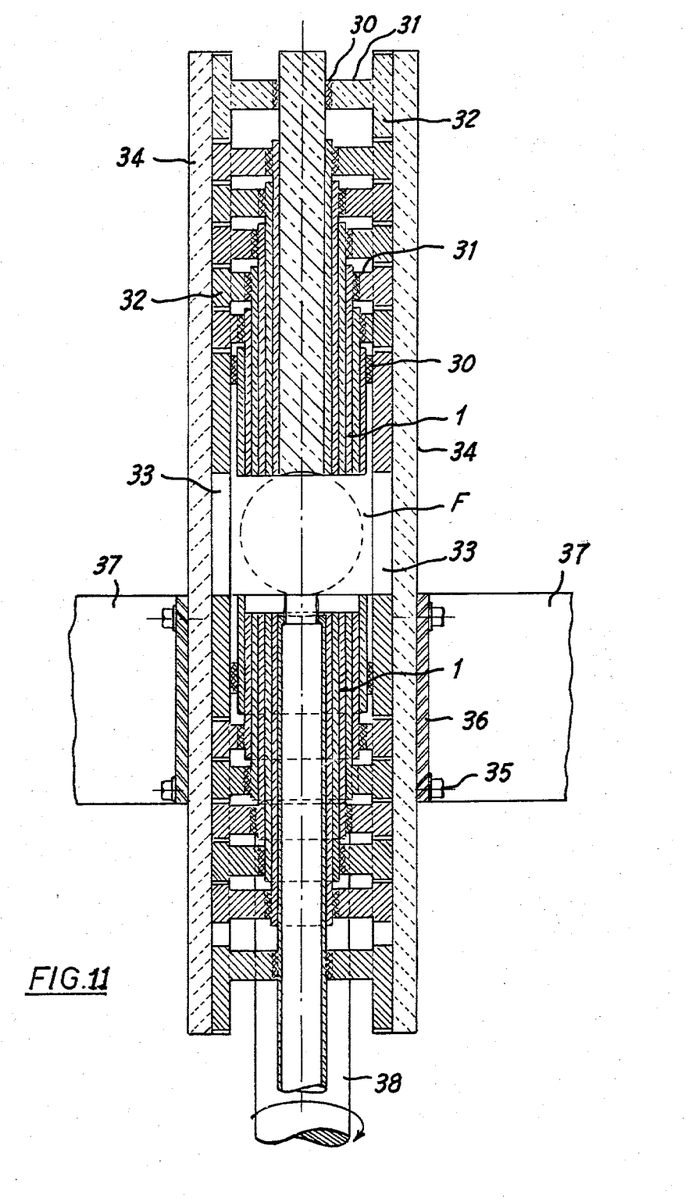
FIG. 11 represents the section along the plane A—A of FIG. 9.

In FIGS. from 9 to 11, a second embodiment of the present invention is represented. In this case, cylinders 1 are supported on a rotor 37 which moves relative to a stationary slotted cam body 42. The cylinders 1 are associated with quadrangular supports 30, each one of which bears a pair of diametral arms 31 ending with a pair of skids 32, slidingly engaged in guides 33, supported by vertical parallel bars 34. These latter are fixed by means of bolts 35 on brackets 36 integral with a rotor, ring rotated by shaft 38.

Each one of cylinders 1 is provided with a pivot 39, orthogonal with respect to arms 31, whereupon a rolling bearing 40 is set, which is engaged in a helicoidal guide 41 machined in stationary body 42 coaxial with rotor 37 and supported by stanchions 43.

The operation is entirely analogous to that already described. Upon rotation of rotor body 37, the bearings 40 act as cam followers, riding in the; helicoidal guides 41 of the stationary body 42, so that the cylinders 1 slide along vertical guides 33, effecting the squeezing of fruit F.

In a complete revolution of ring rotor 37, all the treatment phases of fruit F must be completed. By way of example, sector X could be the one for the squeezing, sector Y the one for the opening of the cylinders and sector Z the one wherein the discharge of the rind and the charge of the new fruit occurs.

For simplicity's sake, in FIG. 1 only a double series of squeezing cylinders 1 is represented, but it is obviously understood that on rotor ring 37, various groups of cylinders, set at constant angular intervals, are envisaged.

The present invention has been described according to a few preferred embodiments, but it is understood that executive variants could be in practice introduced therein from experts in the art, without departing therefore from the protection limits of the present industrial patent.

Having thus described the present invention, what is claimed is:

1. An apparatus for extracting juices and essential oils from whole fruits, comprising a first series of vertical cylinders having fruit-contacting edges, said cylinders being fitted with each other with slight radial clearances therebetween, a second series of cylinders axially aligned with the first series and spaced therefrom to allow for the insertion of a fruit between the first and second series of cylinders, and means for moving said cylinders in each series relative to each other to exert a progressive compressive action, substantially distributed all over the fruit surface.

2. The apparatus of claim 1 wherein the cylinders are movable from an initial position where they form a spherical space for receiving the fruit, said means for moving the cylinders progressively reducing the spherical space to cause wrinkles on the rind of the fruit to extract the essential oil, one of said cylinders below said spherical space including a bore for receiving the endocarp from the fruit.

3. The apparatus of claim 1 or 2 including quadrangular supports fixed to the cylinders, each of said supports being provided with a pair of diametral pivots with bearings thereon, and a member having a series of cam slots receiving said bearings for sliding movement therein to move the cylinders.

4. The apparatus of claim 3 including vertical bars, skids slidable in said vertical bars, said diametral pivots being inserted into said skids, and horizontal parallel guides for supporting the vertical bars for reciprocating motion.

5. The apparatus of claim 1 or claim 2 wherein one of the cylinders has a crown with a cutting edge for cutting the lower part of the fruit and to permit the extraction of the endocarp.

6. The apparatus of claim 1 or claim 2 wherein one of the cylinders has a bore with a tapered perforated wall, a tray surrounding said perforated wall to collect the juice that passes through the perforated wall, said bore having an open lower end for expelling the fibrous part of the fruit.

7. The apparatus of claim 1 or claim 2 including a tray beneath the cylinders for collecting the essential oils flowing between the cylinders.

8. The apparatus of claim 1 or claim 2, privided with a pair of counter-rotating spongy rollers for removing the essential oils from the rind surface after the squeezing, means for rotating said spongy rollers at unequal angular speeds, and a pair of squeezing rollers engaged with said spongy rollers, and collecting trays for receiving essential oils squeezed from the spongy rollers by the squeezing rollers.

9. The apparatus of claim 8 including means for removing the rind after the squeezing is achieved by directing a jet of compressed air against the fruit, a valve for controlling said jet, a cam operatively associated with said valve and a template for deflecting the rind onto the spongy rollers.

10. The apparatus of claim 1 or claim 2 wherein the cylinders are blunt to prevent them from causing lesions on the rind of the fruit.

11. The apparatus of claim 1 having two vertical bars slidably supporting the two series of cylinders, an annular rotor supporting said bars, each of said cylinders having a cam follower, a cylindrical stationary body provided with helicoidal slots which receive said cam followers.

12. The apparatus of claim 11 having two diametral arms on each cylinder, said arms having skids on their outer ends slidably connected to said vertical bars.

13. The apparatus of claim 11 or claim 12 wherein the cam followers extend from their respective cylinders perpendicularly to said arms.

* * * * *